Figure 1:
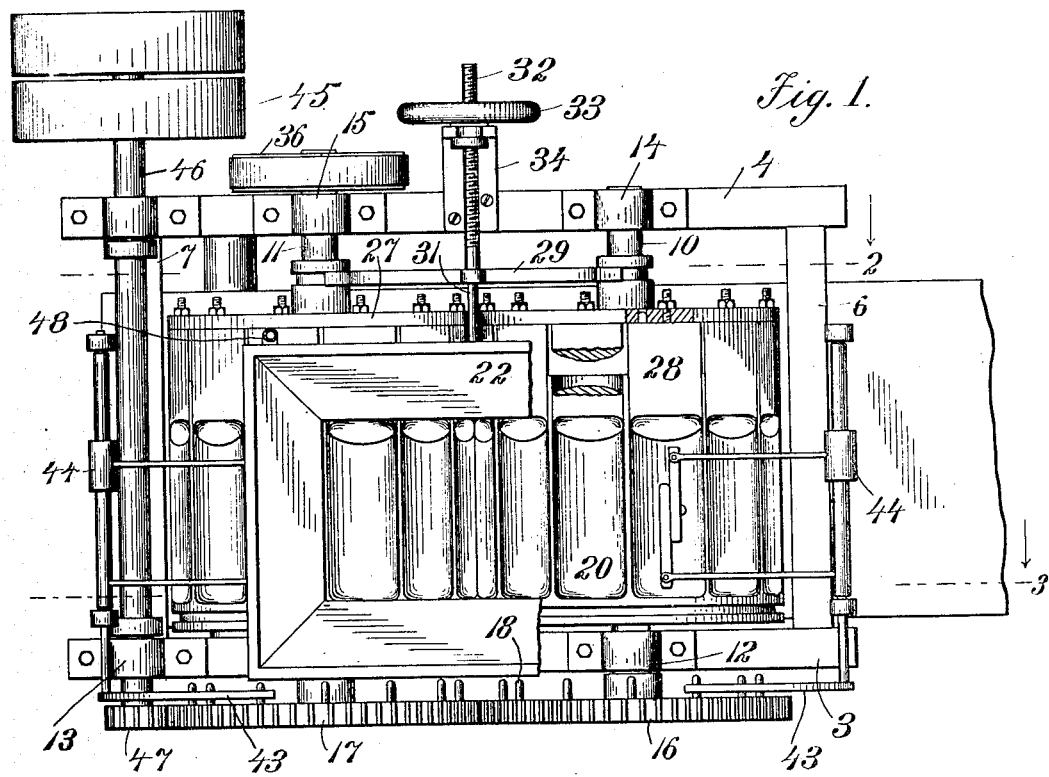

C. LOESCH & C. BÖHME.
DOUGH MOLDING MACHINE.
APPLICATION FILED APR. 1, 1908.

912,695.

Patented Feb. 16, 1909.
3 SHEETS—SHEET 1.

Witnesses
Alex Currie
E. J. Medina

Inventors
Charles Loesch and
Carl Böhme
by
Medina & Griffin
Attorneys

C. LOESCH & C. BÖHME.
DOUGH MOLDING MACHINE.
APPLICATION FILED APR. 1, 1908.

912,695.

Patented Feb. 16, 1909.
3 SHEETS—SHEET 2.

Witnesses

Inventors
Charles Loesch and
Carl Böhme
by
Medina & Griffin
Attorneys

C. LOESCH & C. BÖHME.
DOUGH MOLDING MACHINE.
APPLICATION FILED APR. 1, 1908.
912,695.
Patented Feb. 16, 1909.
3 SHEETS—SHEET 3.
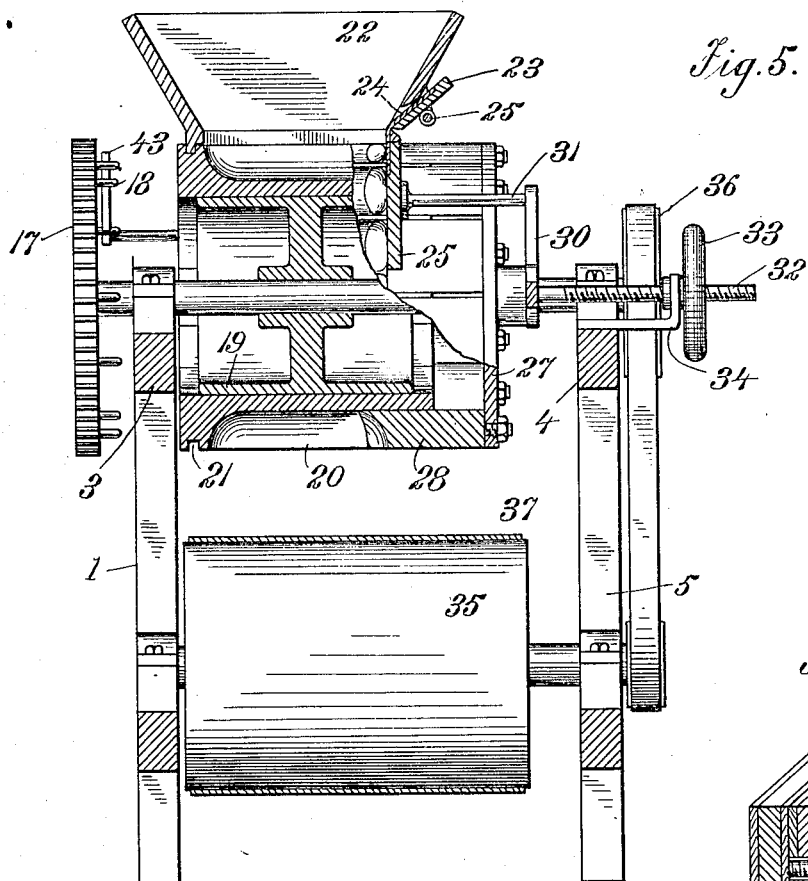
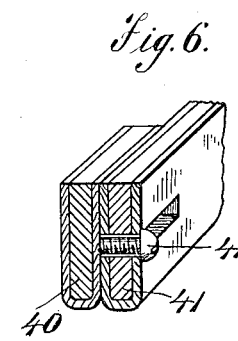
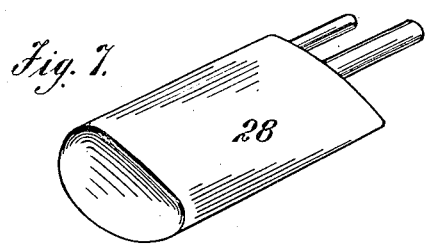
Witnesses
Inventors
Charles Loesch
Carl Böhme
by
Medina & Griffin
Attorneys

UNITED STATES PATENT OFFICE.

CHARLES LOESCH AND CARL BÖHME, OF SAN FRANCISCO, CALIFORNIA.

DOUGH-MOLDING MACHINE.

No. 912,695.          Specification of Letters Patent.          Patented Feb. 16, 1909.

Application filed April 1, 1908. Serial No. 424,573.

*To all whom it may concern:*

Be it known that we, CHARLES LOESCH and CARL BÖHME, citizens of the United States, residing in the city and county of San Francisco and State of California, have invented a new and useful Dough-Molding Machine, of which the following is a specification in such full and clear terms as will enable those skilled in the art to construct and use the same.

This invention relates to a device used for the purpose of dividing dough into such pieces as may be of the desired size for baking purposes.

An object of the invention is to produce such a machine as will divide the dough into any desired size, the size of the dough pocket being adjustable when the machine is running. It will be understood that since some dough is very light and some quite heavy when cut into loaves that the size of the piece cut must vary with the condition of the dough, and this adjustability must be of such a character as to vary the size of the pockets without stopping the machine.

Another object of the machine is to make a machine that will divide the dough without "killing" it. This term is used with respect to certain machines in which the loaf of dough is actually cut or torn from the large mass of dough, and it has the effect of disrupting the gas bubbles in such a manner as to spoil the raising qualities of the dough. With this machine the attempt is made to imitate the action of the hands in forming a loaf from a mass of dough, the loaf being rolled and pressed out rather than forcibly cut out of the mass of dough.

Another object of the invention is to produce a hopper that will be adjustable with the dough pockets and which will prevent the loss of dough when the size of the pockets has been reduced by adjustment of them to smaller sizes.

Another object of the invention is to produce a device that will clean and oil the pockets of the divider in such a manner as to insure the proper handling of the dough and to insure the proper size of each piece of dough cut off.

Other objects of the invention will appear as the description proceeds.

Figure 2:
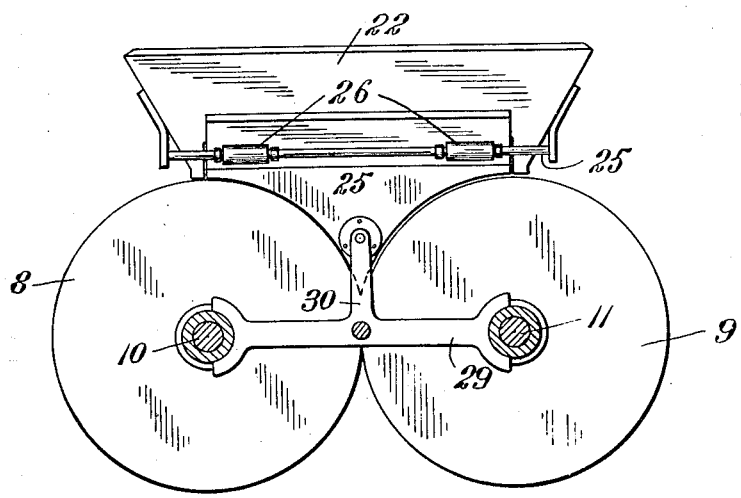
Figure 3:
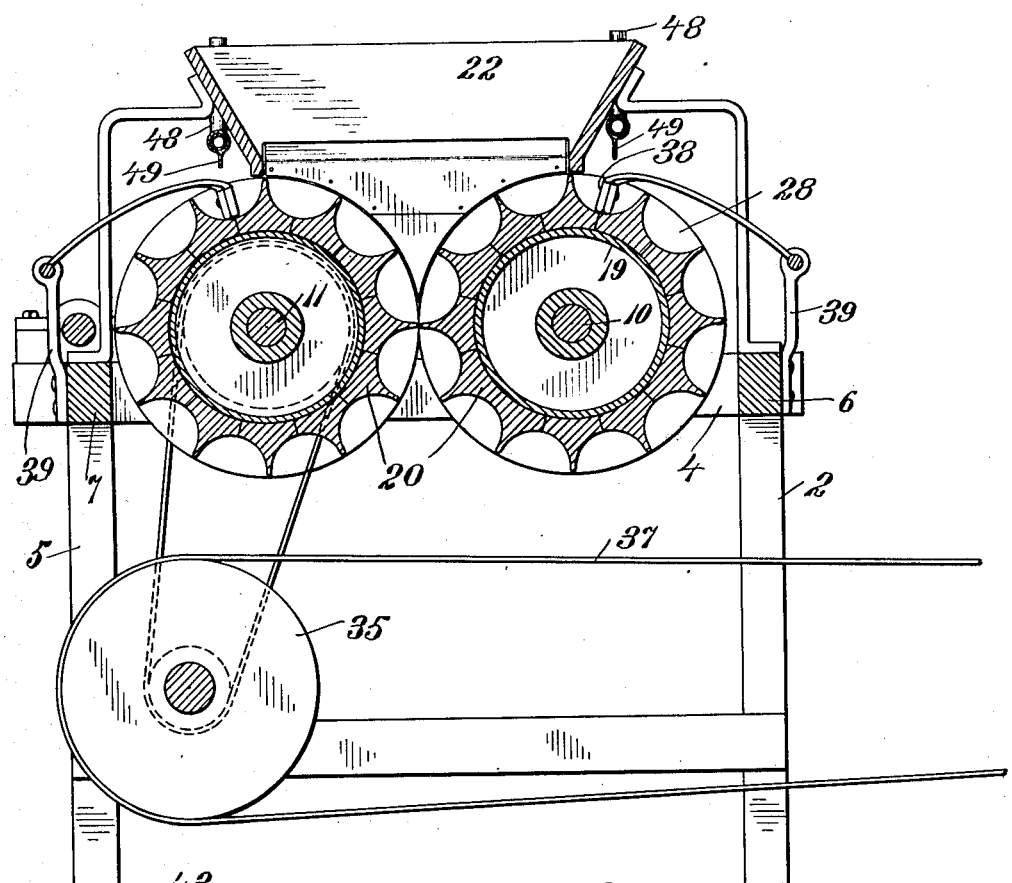
Figure 4:
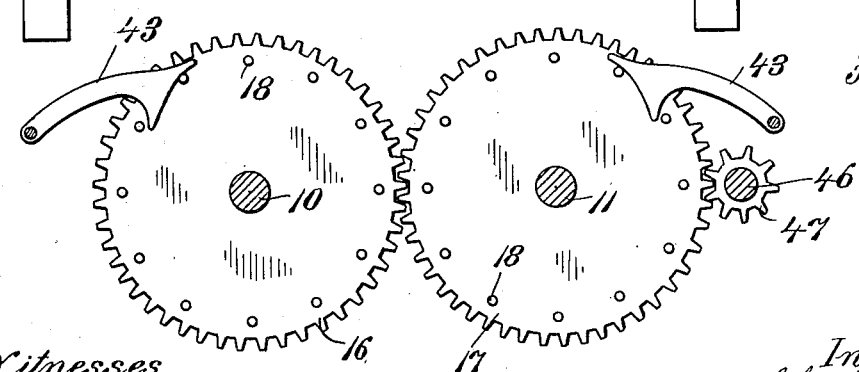

In the drawings in which the same numerals of reference are applied to the same parts throughout, Figure 1 is a plan of the machine, Fig. 2 is a vertical sectional view on the dotted line 2 of Fig. 1 and in the direction of the arrow, Fig. 3 is a sectional view on the dotted line 3 of Fig. 1 and in the direction of the arrow, Fig. 4 is a vertical sectional view of the machine showing the gear wheels that drive the rolls with the pins that lift the oil brush out of the pockets, Fig. 5 is an end view of the machine with certain of the parts shown in section, Fig. 6 is a view of the oil brush showing the means for adjusting it, and Fig. 7 is a view of one of the stubs used for the purpose of adjusting the size of the loaf molded out.

The machine is provided with four legs, of which only the ones marked 1, 2 and 5 are shown in the drawings. On the top of the legs are secured the side rails 3 and 4 which carry the various parts of the machine. The two side rails are connected by means of end rails 6 and 7. The rollers 8 and 9 are carried by shafts 10 and 11 respectively said shafts being journaled in the boxes 12, 13, 14 and 15 which are carried by the side rail of the frame. The roll shafts have on their outer ends the gear wheels 16 and 17 which are of the same diameter as the rolls themselves, each gear wheel being provided with a series of pins 18, the number of pins being the same as the number of pockets in the rolls, the purpose of said pins being to lift the oil brush out of the pockets in the rolls as they are rotated. Each roller is made up of a main part or pulley 19 to which are secured the members 20 which form the pockets of the roller. The pocket members are divided in the bottom of the pockets in order that the portion between adjoining pockets may be as strong as possible and for the additional reason that should a crack be left at the outer edge of the pockets it would eventually get filled with old dough, while at the bottom of the pocket there is little or no pressure to force the dough into such an opening. At one end all the pocket members are provided with a channel 21 which fits a flange on that side of the hopper in order that no dough may be squeezed out from under the hopper and thus be wasted. The hopper is shown at 22 and has one side adjustable for a portion of its depth. This adjustable portion 23 is hinged by means of a closed hinge 24 to a part of the hopper that is shaped to pass down between the rolls as illustrated at 25.

In order to keep the part 23 up close to the bottom of the hopper 22 a rod 25 is secured to the hopper, said rod being provided with a pair of rollers 26 to prevent it from binding when the pockets of the rollers are to be adjusted. Each roller is provided with an end plate 27 to which are secured the fingers 28 said fingers being of the precise shape of the bottom of the pockets of the rollers, and extending into them for any desired distance. The plate 27 is provided with a grooved hub, and there is a plate 29 which is supported by means of the two grooved hubs and which has the upwardly extending member 30 connected with a rod 31, said rod being connected with the portion of the hopper which extends down between the pocketed rollers. The plate 29 is also connected with the threaded rod 32 which passes through the hand wheel 33, said wheel being supported by means of the bracket 34 on the side rail of the frame of the machine. It will thus be apparent that any motion of this hand wheel will cause the plate 29 and its connected parts to move toward or away from the side rail of the machine and it will thus enlarge or reduce the size of the loaf made by the rollers, and it will be apparent that this change in the size of the loaf may be made while the machine is running.

On the lower portion of the frame of the machine there is placed a large roller 35 which is driven from the pulley 36 on the end of one of the pocketed rollers, an apron 37 passing over the said roller for the purpose of taking the molded loaves away from the machine and to any desired place.

Over each of the pocketed rolls there is placed a brush for the oil used to prevent the bread from sticking to the pockets of the machine. The brush 38 is supported by two brackets 39 and pivoted therein; the parts 40 and 41 being adjustable so that they will properly grease all the inside of the pockets even when the largest size loaf is to be molded. This adjustable feature is shown in Fig. 6, the adjustment being carried out by simply loosening the screw 42 and moving one of the parts of the brush on the other. The pivot of the brush is provided with the cam 43 which comes into contact with the pins of the roller and allows the brush to pass down into the pocket and raises it out of the pocket when the proper time comes, this being necessary to prevent the brush and the edge of the pocket from being injured. There are two of the brushes on the machine, one for each pocketed roll. The part 40 is carried by an arm which is secured to a sleeve 44 which slides along the pivot rod.

The machine is driven by means of the pulley 45 on the shaft 46 said shaft having the small pinion 47 at one end which meshes with one of the large gears on the end of the roll shaft.

In order to provide for the supply of oil used to prevent the dough sticking to the pockets of the rolls, the oil tube 48 is secured to the under side of the edge of the hopper, said oil tube having a series of holes therein and having the cloth 49 around it in order to spread the oil. The brush moves down into the pockets and then up and as it moves up it comes into contact with the cloth on the oil tube and each time it takes a small quantity of grease, enough to grease the pocket for the next loaf of bread.

It will be understood that while the term "bread" has been used in this specification, and while the machine is specially adapted to use on a dough which must be worked in a manner similar to hand working, that the machine may be used for other purposes where a given amount of a plastic material is to be made into a loaf or pat.

In operation the dough is simply placed in the hopper, usually it comes from a chute in a room a story higher than the floor of the room in which the molding machine is placed, the rolls are rotated at a rate which will deliver about 100 to 150 loaves per minute and the running of the machine is continued till the supply of dough has been exhausted, the size of the loaf cut off being regulated at the will of the operator.

Having thus described our invention what we claim as new and desire to secure by Letters Patent of the United States is as follows, modifications within the scope of the claims being reserved.

1. In a dough molding machine, the combination with a pair of pocketed rolls of means to adjust the length of the pockets while the machine is running.

2. In a dough dividing machine, the combination of a pocketed roll, a second roll adjacent the first roll and means to adjust the length of the roll pockets while the machine is in operation.

3. In a dough dividing machine, the combination of a pocketed roll, a second roll adjacent the first roll, means to adjust the length of the roll pockets while the machine is running, and means to prevent an accumulation of dough in each of the pockets.

4. In a dough dividing machine, the combination of a pocketed roll, a second roll adjacent the first roll, means to adjust the length of the roll pockets while the machine is running, means to prevent an accumulation of dough in the pockets, and means to deliver a quantity of oil to said means when it has been lifted out of the pocket.

5. In a dough dividing machine, the combination of a pocketed roll, a second roll adjacent the first roll, means to adjust the length of the pockets when the machine is running, means to prevent an accumulation of dough in the pockets, said means consisting of a pivoted bar having a cam which lifts the bar out of the pockets said bar falling into the pockets by its own weight, and means to deliver a quantity of oil to the bar.

6. In a pocketed roll for dough dividing machines, the combination of a pulley, a series of fluted members secured to the pulley the entire series forming a complete roll with a corresponding series of pockets, each of said members being separated from its adjacent member at substantially the bottom of each pocket, and fingers movable longitudinally of each pocket for varying the length of said pockets.

7. In a dough dividing machine, the combination of a pocketed roll, a roll adjacent the pocketed roll, a hopper over the pair of rolls, means to vary the length of the pockets in the roll, and means to vary the width of the hopper to correspond with the length of the pockets in the pocketed roll.

8. In a dough dividing machine, the combination of a pocketed roll, a roll adjacent the pocketed roll, a hopper over the two rolls, means to change the length of the pockets in the pocketed roll, and means to change the width of the hopper to correspond with the width of the pockets in the pocketed roll.

9. In a dough dividing machine, the combination of a pocketed roll, means to change the length of the said pockets at will, a second roll adjacent the pocketed roll, a hopper over the two rolls, means to change the width of the hopper to correspond with the width of the pockets said means also connected with the means for changing the length of said pockets, and means to rotate the rolls.

In testimony whereof we have set our hands in the presence of the two subscribed witnesses.

CHARLES LOESCH.
CARL BÖHME.

Witnesses:
  C. P. GRIFFIN,
  FRANK P. MEDINA.